United States Patent [19]

Nozawa et al.

[11] 4,435,771
[45] Mar. 6, 1984

[54] SYSTEM FOR NUMERICALLY CONTROLLING A MACHINE TOOL

[75] Inventors: Ryoichiro Nozawa, Tokyo; Nobuyuki Kiya, Hachioji, both of Japan

[73] Assignee: Fujitsu Fanuc Limited, Tokyo, Japan

[21] Appl. No.: 250,596

[22] Filed: Apr. 3, 1981

[30] Foreign Application Priority Data

Apr. 4, 1980 [JP] Japan ................................. 55-43446

[51] Int. Cl.³ ............................................. H02M 1/06
[52] U.S. Cl. ................. 364/474; 340/825.23; 318/562; 318/569; 364/138
[58] Field of Search ............... 364/474, 475, 138, 139, 364/167–171; 318/562, 569; 340/825.06, 825.07, 825.23

[56] References Cited

U.S. PATENT DOCUMENTS

| | | | |
|---|---|---|---|
| 3,668,653 | 6/1972 | Fair et al. | 364/171 |
| 3,720,814 | 3/1973 | Klein | 364/138 |
| 4,069,488 | 1/1978 | Fiorenza et al. | 364/138 X |
| 4,124,887 | 11/1978 | Johnson et al. | 364/138 |
| 4,281,379 | 7/1981 | Austin | 364/474 X |

OTHER PUBLICATIONS

EIA Standard RS–408, Electronic Industries Association, Mar. 1973, pp. 1–7.

Primary Examiner—Joseph F. Ruggiero
Attorney, Agent, or Firm—Armstrong, Nikaido, Marmelstein & Kubovcik

[57] ABSTRACT

A system for numerically controlling a machine tool comprising a plurality of machine tools, a plurality of numerical control circuits and a computer as an entirely automatic operation commander device, for carrying out the control of the entire processes of said plurality of machine tools with a central control station.

5 Claims, 4 Drawing Figures

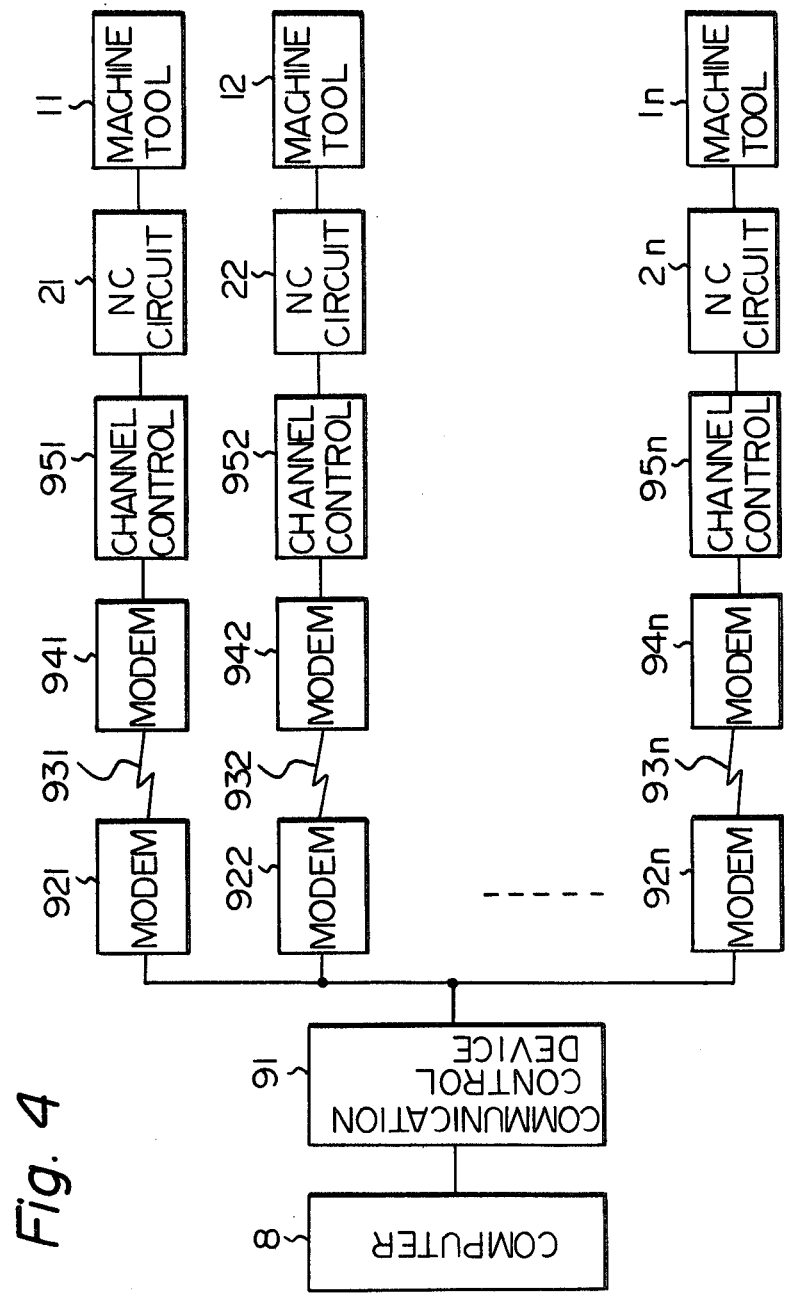

SYSTEM FOR NUMERICALLY CONTROLLING A MACHINE TOOL

TECHNICAL FIELD

The present invention relates to a system for numerically controlling a machine tool.

BACKGROUND ART

A prior art programmed control process of a system for numerically controlling a machine tool with the use of an electronic computer is illustrated in FIG. 1. Either the signal $P_a$ from a tape reader 5 or the signal from an electronic computer 6 is selectively supplied to a numerical control (NC) circuit 2 for a machine tool 1. The data are exchanged through transmission lines between the numerical control circuit 2 and the machine tool 1. A manual data inputting panel (MDIP) 3 (alternatively designated "manual data panel" hereinafter) provided in the numerical control circuit 2 receives an input signal $M_a$ from an operator and sends an output signal $M_b$ to the operator.

However, in order to carry out a program control with the use of said computer 6 in the system of FIG. 1, it is necessary to obtain the input signal $D_i$ from the machine tool 1 and the output signal $D_o$ for the machine tool 1 which are being exchanged between the numerical control circuit 2 and the machine tool 1, and the signals $M_a$ and $M_b$ which are applied to and displayed at the manual data inputting panel 3, and then to have the computer operate on the basis of the obtained data. Such processes in the system of FIG. 1 have been inconvenient and unsatisfactory from the viewpoint of the performance of an automatic programmed control of the system.

SUMMARY OF THE INVENTION

It is the main object of the invention to realize a numerical control of a machine tool of the direct numerical control (DNC) system with an electronic computer of the general use type in the form of the entirely automatic operation commander, on the basis of the idea of using an electronic computer for the entirely automatic operation commander which is common to a plurality of numerical control circuits for machine tools.

In accordance with the present invention there is provided a system for controlling numerically a machine tool having at least a numerical control circuit including a manual data panel, characterized in that: said system comprises a plurality of machine tools, a plurality of numerical control circuits, each of which includes a manual data inputting panel, an entirely automatic operation commander device which is provided commonly for said plurality of numerical control circuits, and transmission means between each of said numerical control circuits and said operation commander device for exchanging input data for said machine tool and output data from said machine tool, for exchanging data for said manual data panel and data from said manual data panel and for exchanging treatment program data; whereby the entire processes of said plurality of machine tools are controlled by said operation commander device.

BRIEF DESCRIPTION OF THE DRAWINGS

FIG. 4 illustrates a schematic diagram of a system of FIG. 2 in association with a communication network.

DESCRIPTION OF THE PREFERRED EMBODIMENTS

Figure 1:
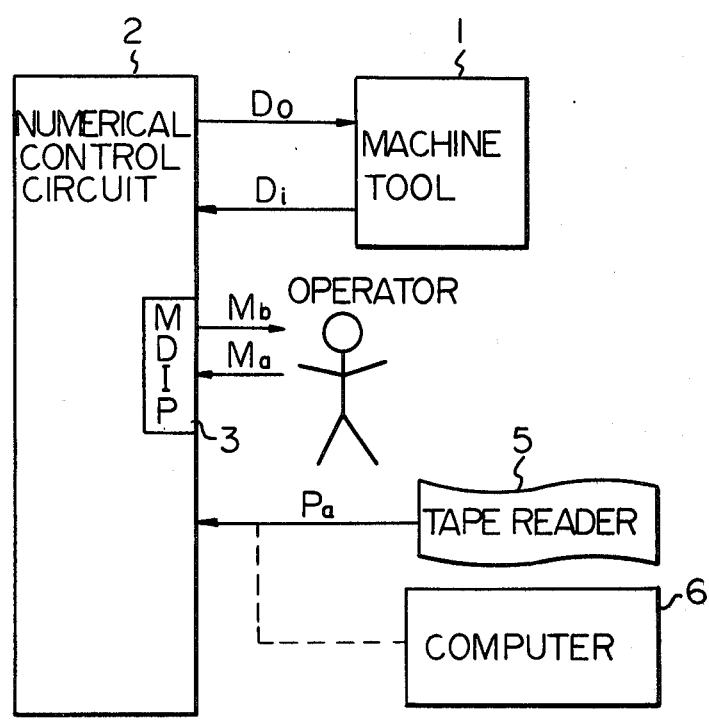
FIG. 1 illustrates a schematic diagram of a prior art system for numerically controlling a machine tool with the use of an electronic computer.
Figure 2:
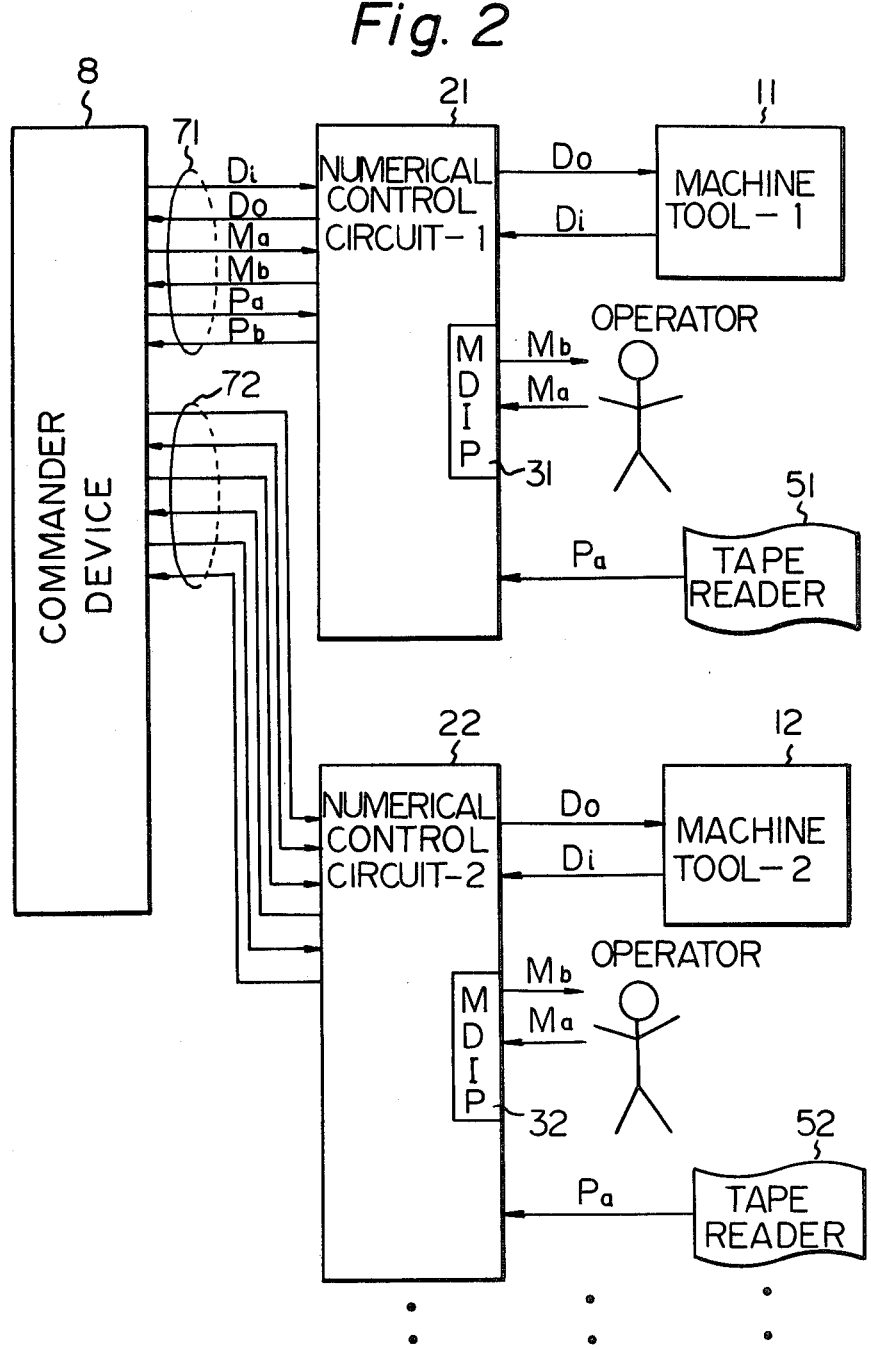
FIG. 2 illustrates a schematic diagram of a system for numerically controlling a machine tool with the use of an electronic computer in accordance with an embodiment of the present invention.

A circuit for realizing a numerical control system for a machine tool in accordance with an embodiment of the present invention is illustrated in FIG. 2. A plurality of numerical control circuits 21, 22, ... are provided for a plurality of machine tools 11, 12, ..., respectively. Input data $D_i$ from the machine tool 11 and output data $D_o$ for the machine tool 11 are exchanged between the machine tool 11 and the numerical control circuit 21 through transmission lines. Manual data inputting panels 31, 32, ... are provided for the numerical control circuits 21, 22, ..., respectively. The panels 31, 32, ... receive manual inputs $M_a$ from an operator and send display output $M_b$ to the operator. Program inputs $P_a$ are supplied to numerical control circuits 21, 22, ... fron tape readers 51, 52, ..., respectively.

An electronic computer 8, as an entirely automatic operation commander device, is provided commonly to the plural numerical control circuits 21, 22, .... Each numerical control circuit 21, 22, ... is connected to the computer 8 through one of the transmission routes 71, 72, .... For example, input data $D_i$ from the machine tool, output data for the machine tool, manual input data $M_a$ to the panel, display output data $M_b$ on the panel, delivered program input $P_a$ and fed-back program input $P_b$ are exchanged between the computer 8 and the numerical control circuit 21 through the transmission route 71.

In the circuit of FIG. 2, by sending data regarding keys on the manual data inputting panel 31 from the computer 8 to the numerical control circuit 21, the manual data inputting panel 31 can be controlled at the computer 8. Also, information regarding the tool input data $D_i$ which is sent from the machine tool 11 to the numerical control circuit 21 can be sent from the computer 8 to the numerical control circuit 21. Further, information regarding the data $D_o$ which is sent from the numerical control circuit 21 to the machine tool 11 can be sent from the numerical control circuit 21 to the computer 8.

Figure 3:
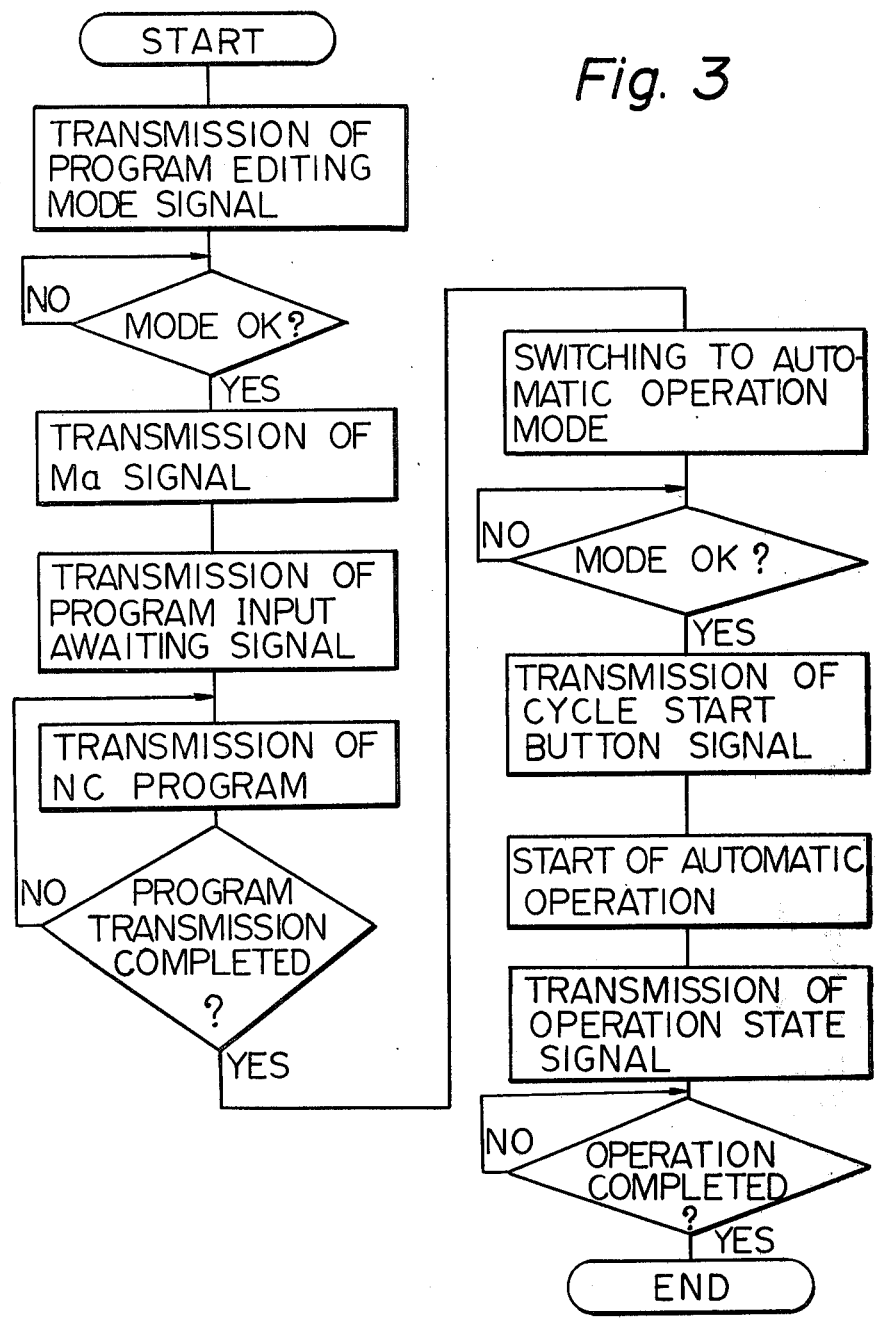
FIG. 3 illustrates a logic flow chart for the system of FIG. 2.

The processes of the operation of the circuit of FIG. 2 are illustrated in the logic flow chart of FIG. 3. At the start, a program editing mode signal is sent from the computer 8 to the numerical control circuit 21 through the line for $D_i$. A replay signal for the inquiry "Is the mode OK?" is sent from the numerical control circuit to the computer 8. If the mode is OK, a signal corresponding to the $M_a$ operation on the panel 31 is sent from the computer 8 to the numerical control circuit 21 through the line for $M_a$. Then, a program input awaiting signal is sent from the numerical control circuit 21 to the computer 8 through the line for $P_b$. Then, a numerical control program is transmitted from the computer 8 to the numerical control circuit 21. Then, it is determined whether or not the transmission of said numerical control program is completed. If it is determined that the transmission is completed, a signal for switching the mode into the automatic operation mode is sent from the computer 8 to the numerical control circuit 21 through the line for $D_i$. Then, a reply signal for the inquiry "Is the mode OK?" is sent from the numerical control circuit 21 to the computer 8. If the mode is OK, a cycle start button signal is sent from the computer 8 to the numercial control circuit 21 through the line for $D_i$. Upon receipt of said cycle start button signal, the automatic operation of the machine tool 11 is started. After the start of said automatic operation, operation state signals are sent from the numerical control circuit 21 to the computer 8. A monitoring of said operation state signals is carried out by the computer 8. When the computer 8 detects that the operation of the machine tool 11 is completed, a command of the computer 8 stops the operation of the machine tool 11.

A system in which the circuit of FIG. 2 is included in association with a communication network is illustrated in FIG. 4. The computer 8, as the entirely automatic operation commander device (CMD), is connected to the transmitter side MODEMs 921, 922, ... 92n through the communication control device. The transmitter side MODEMs 921, 922, ... 92n are connected to the receiver side MODEMs 941, 942, ... 94n through the communication channels 931, 932, ... 93n, respectively. The receiver side MODEMs 941, 942, ... 94n are connected to the numerical control circuits 21, 22, ... 2n through the channel control devices 951, 952, ... 95n, respectively. The numerical control circuits 21, 22, ... 2n are connected to the machine tools 11, 12, ... 1n.

In accordance with the system of FIG. 4, the operations of many machine tools located separately and at various great distances from the central control station can be controlled by a computer, as an entirely automatic operation commander device, in said central control station. By applying the system of FIG. 4 to many machine tools distributed in many factories which belong to one organization, it is even possible to realize the operation of said many machine tools without the attendance of operators for said machine tools.

I claim:

1. A method for numerically controlling a plurality of machine tools by means of a computer connected in common to a plurality of numerical control circuits, each of which is connected to a different one of said machine tools and each of which has a manual data panel, the operation of said method comprising the steps of:

transmitting from the computer to a numerical control circuit a program editing mode signal;

deciding first whether or not the mode is suitable;

under the condition that the result of the first decision is affirmative, transmitting a manual input data (Ma) from the computer to the numerical control circuit;

transmitting a program input awaiting signal from the numerical control circuit to the computer;

transmitting a numerical control program from the computer to the numerical control circuit;

deciding second whether or not the transmission of the numerical control program is completed;

under the condition that the result of the second decision is affirmative, transmitting a signal for switching the mode into the automatic operation mode from the computer to the numerical control circuit;

deciding third whether or not the mode is suitable;

under the condition that the result of the third decision is affirmative, transmitting a cycle start button signal from the computer to the numerical control circuit;

starting an automatic operation of the machine tool;

transmitting operation state signals from the numerical control circuit to the computer;

monitoring the transmitted operation state signals by the computer;

deciding fourth whether or not the operation of the machine tool is completed; and terminating the operation of the machine tool when the affirmative result of the fourth decision is obtained.

2. A method as defined in claim 1 wherein the first decision is repeated when the result of the first decision is negative.

3. A method as defined in claim 1 wherein the numerical control program signal transmission and the subsequent second decision are repeated when the result of the second decision is negative.

4. A method as defined in claim 1 wherein the third decision is repeated when the result of the third decision is negative.

5. A method as defined in claim 1 wherein the fourth decision is repeated when the result of the fourth decision is negative.

* * * * *